(12) United States Patent
Ishikawa et al.

(10) Patent No.: US 7,952,246 B2
(45) Date of Patent: May 31, 2011

(54) ELECTRIC COMPRESSOR

(75) Inventors: Masayuki Ishikawa, Aichi (JP); Takayuki Hagita, Aichi (JP); Takeshi Hirano, Aichi (JP); Takayuki Watanabe, Aichi (JP); Hisashi Murabayashi, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 249 days.

(21) Appl. No.: 12/445,530

(22) PCT Filed: Sep. 21, 2007

(86) PCT No.: PCT/JP2007/068371
§ 371 (c)(1),
(2), (4) Date: Apr. 14, 2009

(87) PCT Pub. No.: WO2008/102470
PCT Pub. Date: Aug. 28, 2008

(65) Prior Publication Data
US 2010/0084933 A1 Apr. 8, 2010

(30) Foreign Application Priority Data
Feb. 23, 2007 (JP) ................... 2007-043272

(51) Int. Cl.
*H02K 5/00* (2006.01)
(52) U.S. Cl. ...................... 310/89; 310/254.1
(58) Field of Classification Search .................. 310/89, 310/254.1, 261.1
See application file for complete search history.

(56) References Cited

U.S. PATENT DOCUMENTS
4,888,510 A * 12/1989 Hunt ............................... 310/54
5,331,238 A * 7/1994 Johnsen ........................ 310/58
(Continued)

FOREIGN PATENT DOCUMENTS
EP 1533527 A1 5/2005
(Continued)

OTHER PUBLICATIONS
International Search Report of PCT/JP2007/068371, date of mailing Dec. 4, 2007.

*Primary Examiner* — Thanh Lam
(74) *Attorney, Agent, or Firm* — Westerman, Hattori, Daniels & Adrian, LLP

(57) ABSTRACT

To provide an electric compressor in which the occurrence of shrink-fitting failures can be prevented when a stator is shrink-fitted in a motor case. Provided are a casing (67) in which the inner circumferential surface of the cylinder is provided with a first inner circumference (101) and a second inner circumference (103) whose radius is larger than the first inner circumference (101), the inner circumference (101) having an inclination that becomes more distant from a central axis (C) from a bottom face (79) toward an opening (85); a compressing unit that compresses fluid; and a rotor and a stator that rotationally drive the compressing unit, wherein the first inner circumference (101) and the second inner circumference (103) are provided with a substantially cylindrical insertion surface (105) whose radius is larger than the second inner circumference (103) and in which the stator is inserted; and at least the first inner circumference (101) is provided with an enlarged diameter portion (109) whose radius is larger than the insertion surface (105) and which makes the distance from the end at the opening (85) side of the insertion surface (105) to the opening (85) substantially equal.

7 Claims, 8 Drawing Sheets

U.S. PATENT DOCUMENTS

| | | | |
|---|---|---|---|
| 5,998,904 A * | 12/1999 | Hattori | 310/216.071 |
| 6,836,045 B2 * | 12/2004 | Murakami et al. | 310/156.53 |
| 6,836,051 B2 * | 12/2004 | Hiwaki et al. | 310/254.1 |
| 7,164,218 B2 * | 1/2007 | Kimura et al. | 310/216.044 |
| 7,331,774 B2 * | 2/2008 | Ueda et al. | 418/55.5 |
| 7,767,105 B2 * | 8/2010 | Uetsuji et al. | 216/58 |
| 2004/0124731 A1 * | 7/2004 | Kimura et al. | 310/216 |
| 2005/0115055 A1 | 6/2005 | Kimura et al. | |

FOREIGN PATENT DOCUMENTS

| | | |
|---|---|---|
| JP | 57-43367 A | 3/1982 |
| JP | 9-287585 A | 11/1997 |
| JP | 11-294361 A | 10/1999 |
| JP | 2004-332614 A | 11/2004 |
| JP | 2005-155368 A | 6/2005 |
| JP | 2005-233072 A | 9/2005 |

* cited by examiner

ELECTRIC COMPRESSOR

TECHNICAL FIELD

The present invention relates to electric compressors, and in particular, to an electric compressor in which a stator of a motor unit is shrink-fitted in a motor case of the electric compressor.

BACKGROUND ART

A known electric compressor in the related art is provided with a compressing unit that compresses fluid and a motor unit that drives the compressing unit. The motor unit is provided with a rotor and a stator that generate a rotating force to be transferred to the compressing unit. The rotor is connected to the compressing unit, and the stator is fixed to the motor case of the electric compressor.

Known methods for fixing the stator to the motor case are press fitting, shrink fitting, and welding. Among these fixing methods, shrink fitting is a method which allows easy insertion of the stator into the motor case by heating the motor case to thermally expand it and fixing the stator in the motor case more firmly due to shrinkage of the motor case when its temperature decreases.

For fixing by shrink fitting, the problems of deformation of the motor case and stator insertion failures have been noted. However, various technologies for solving such problems have been proposed (for example, refer to Patent Documents 1 and 2); therefore, shrink fitting is used to fix stators into motor cases.

Patent Document 1: Japanese Unexamined Patent Application, Publication No. Hei-9-287585.
Patent Document 2: Japanese Unexamined Patent Application, Publication No. 2004-332614.

DISCLOSURE OF INVENTION

To improve productivity and reduce production costs, the above-described motor case is produced by forming a motor case material having a rough shape by casting (for example, die casting), followed by machining or the like only portions that require dimensional accuracy. For example, the surface (hereinafter, referred to as a shrink-fitting surface), in contact with the above-descried stator, of the inner peripheral surface of the motor case is machined in a cylindrical shape because dimensional accuracy is required. On the other hand, the other areas of the above-described inner peripheral surface that do not require dimensional accuracy are often kept as is in the form of the motor case material surface (a surface after casting, hereinafter, referred to as a mill-scale surface).

On the other hand, the side wall of the motor case is provided with a mounting portion for mounting an electric compressor to an external unit or the like, an accommodation chamber for accommodating an inverter for controlling electric power to be supplied to the motor unit, and so on. This requires the vicinity of the mounting portion and the accommodation chamber to have increased side wall thickness to ensure a sufficient wall thickness that can endure stress due to mounting and a wall thickness necessary for providing threaded holes.

Ways that have been considered to increase the thickness of the side wall include increasing the thickness outward from the motor case and increasing it inward. However, there is often a need to ensure a distance from other units disposed around the electric compressor. In this case, the method for increasing the thickness of the side wall inward is used.

The inner peripheral surface of the motor case material has an inclination such that the inner peripheral surface widens toward the opening to facilitate removing the mold from the interior of the motor case. In other words, the inner peripheral surface is shaped like a conical surface that widens toward the opening.

As described above, if the side wall of the motor case material is partially increased in thickness, the inclined inner peripheral surface is located at a proximal position in the direction approaching the central axis of the motor case material.

When the above-described shrink-fitting surface is formed by machining in this state, the position of the boundary between the shrink-fitting surface and the mill-scale surface at the opening side becomes uneven because the distance from the mill-scale surface at the inner periphery of the motor case material to the central axis of the motor case material varies, which may cause shrink-fitting failures when the stator is shrink-fitted.

That is, when the stator is shrink-fitted in the motor case, portions where the stator and the shrink-fitting surface first come into contact become asymmetric about the central axis of the motor case, which causes a rotation moment to act on the stator. When the stator is rotated by the rotation moment, the pushing force of the stator against the shrink-fitting surface increases in accordance with an inserting force applied to the stator, thus also increasing a frictional force that acts on the stator. This makes it impossible to insert the stator into the motor case, thus posing the problem of shrink-fitting failures wherein the stator cannot be inserted to a predetermined position.

The present invention is made to solve the above problems, and accordingly, it is an object of the present invention to provide an electric compressor in which the occurrence of shrink-fitting failures can be prevented when a stator is shrink-fitted in a motor case.

To achieve the above object, the present invention provides the following solutions.

The present invention provides an electric compressor including: a casing that is a substantially cylindrical member having a bottom face at one end and an opening at the other end, wherein the inner circumferential surface of the cylinder is provided with a first inner circumference and a second inner circumference whose radius is larger than the first inner circumference, the inner circumferential surface having an inclination that becomes more distant from a central axis from the bottom face toward the opening; a compressing unit that compresses fluid; and a motor unit including a rotor and a stator that rotationally drive the compressing unit, wherein the first inner circumference and the second inner circumference are provided with a substantially cylindrical insertion surface whose radius is larger than the second inner circumference in a cross section perpendicular to the central axis of the casing and in which the stator is inserted; and at least the first inner circumference is provided with an enlarged diameter portion whose radius is larger than the insertion surface and which makes the distance from the opening-side end of the insertion surface to the opening substantially equal.

According to the present invention, provision of the enlarged-diameter portion on the first inner circumference and the second inner circumference can make the distance from the end of the insertion surface to, the opening substantially equal around the circumference of the insertion surface. Alternatively, provision of the enlarged-diameter portion only on the first inner circumference can increase the distance from the end of the insertion surface of the first inner circumference to the opening so as to make the distance from the end of the insertion surface to the opening match the distance from the insertion-surface end of the second inner circumference to the opening, thus allowing the distance to be made substantially equal around the circumference of the insertion surface.

In other words, this can reduce variations in insertion length between the stator and the insertion surface, thereby preventing partial contact between the stator and the insertion surface when inserting (for example, shrink-fitting) the stator into the insertion surface and thus reducing a rotation moment that acts on the stator.

In the above invention, it is preferable that the casing be provided with a third inner circumference whose radius is larger than the enlarged diameter portion and which disposed closer to the opening than at least the first inner circumference and the second inner circumference.

With this configuration, the opening-side end of the insertion surface is located at the joint portion between the first inner circumference and the third inner circumference and at the joint portions between the second inner circumference and the third inner circumference. This eliminates the need for forming the enlarged-diameter portion in the area in which the third inner circumference is formed, which can reduce an area in which the enlarged-diameter portion is to be formed as compared with a case in which the third inner circumference is not formed.

In the above configuration, it is preferable that the first inner circumference and the second inner circumference be provided so as to extend like a strip-shaped from the bottom face toward the opening.

With this configuration, since the first inner circumference and the second inner circumference are formed like a strip-shaped, the insertion surface can also be formed as part of a cylindrical surface extending like a strip-shaped. This allows the contact area between the stator and the insertion surface to be limited, thus making it easier to reduce variations in insertion surface length between the stator and the insertion surface.

Since the area in which the first inner circumference and the second inner circumference are formed can be reduced as compared with a case in which the first inner circumference and the second inner circumference are not formed like a strip-shaped, the area in which the enlarged-diameter portion is to be formed can be reduced.

In the above configuration, it is preferable that the second inner circumference be disposed closer to the bottom face than at least the first inner circumference.

With this configuration, the opening-side end of the insertion surface formed on the second inner circumference is located closer to the bottom face than the opening-side end of the insertion surface formed on the first inner circumference. In this case, forming the enlarged-diameter portion only on the first inner circumference can reduce variations in insertion surface length between the stator and the insertion surface.

In the above configuration, it is preferable that the outer peripheral surface of the casing at which the first inner circumference is provided have a mounting unit.

With this configuration, the area of the casing in which the first inner circumference is provided is larger in thickness from the inner peripheral surface to the outer peripheral surface of the casing than the area in which the second inner circumference is provided. This makes it easy to ensure sufficient strength to withstand stress applied to the base of the mounting unit, thus making it easier to ensure a sufficient wall thickness of the mounting unit for forming a concave structure, such as a mounting hole.

In the above configuration, it is preferable that the outer peripheral surface of the casing at which the first inner circumference is provided have a mounting unit and the mounting unit be provided with a mounting hole to which a supply unit for supplying electric power to the motor unit is mounted.

This configuration ensures a sufficient thickness from the inner peripheral surface to the outer peripheral surface in the area of the casing in which the mounting unit is provided, as compared with the other areas, thereby preventing the mounting hole for mounting the supply unit from passing through the casing.

In the above configuration, it is preferable that the outer peripheral surface of the casing at which the first inner circumference is provided have a mounting unit and the mounting unit be used to mount the casing to an external fixing object.

This configuration ensures a sufficient thickness from the inner peripheral surface to the outer peripheral surface in the area of the casing in which the mounting unit is provided, as compared with the other areas, thereby allowing the electric compressor to withstand stress applied to the base of the mounting unit when an external force is applied to the electric compressor.

An electric compressor according to the present invention offers the advantage of making the distance from the end of the insertion surface to the opening substantially equal around the circumference of the insertion surface by providing an enlarged-diameter portion on the first inner circumference and the second inner circumference or only on the first inner circumference, thereby preventing the occurrence of insertion failures when shrink-fitting a stator into a motor case.

EXPLANATION OF REFERENCE SIGNS

Figure 1:
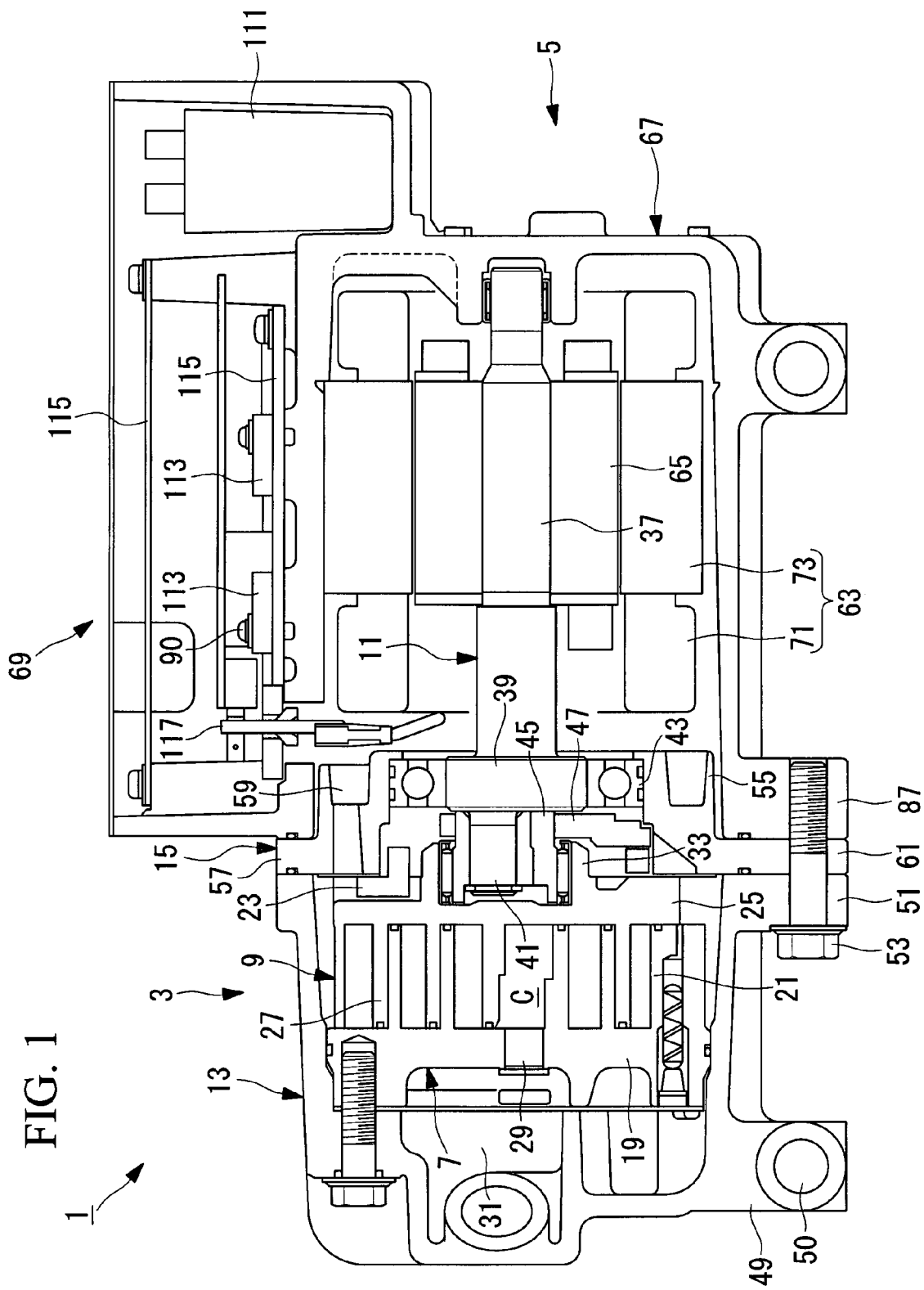
FIG. 1 is a sectional view describing in outline the configuration of an electric compressor according to an embodiment of the present invention.

1: electric compressor
3: scroll compressing unit (compressing unit)
5: motor unit
63: stator
65: rotor
67: motor case (casing)
69: inverter (supply unit)
79: bottom face
81: opening
83: box (mounting portion)
89: threaded hole (mounting hole)
95: inner circumferential surface (third inner circumference)

101: first inner circumferential surface (first inner circumference)
103: second inner circumferential surface (second inner circumference)
105: shrink-fitting surface
109: enlarged-diameter portion
85: second mounting portion (mounting portion)

BEST MODE FOR CARRYING OUT THE INVENTION

An electric compressor according to an embodiment of the present invention will be described with reference to FIGS. 1 to 8.

FIG. 1 is a sectional view describing in outline the configuration of an electric compressor according to an embodiment of the present invention.

In this embodiment, an electric compressor 1 is described when applied to a compressor for use in a vehicle air conditioner, which is an electric compressor in which the driving speed is controlled by an inverter.

As shown in FIG. 1, the electric compressor 1 is provided with a scroll compressing unit (compressing unit) 3 for compressing refrigerant (fluid) used in a vehicle air conditioner and a motor unit 5 for driving the scroll compressing unit 3.

The scroll compressing unit 3 is provided with a fixed scroll 7 and a rotary scroll 9 for compressing refrigerant, a main shaft 11 that transfers the rotational driving force of the motor unit 5 to the rotary scroll 9, a first housing 13 that accommodates the fixed scroll 7 and the rotary scroll 9, and a second housing 15 that supports the main shaft 11, to be described later.

The fixed scroll 7 is provided with a fixed end plate 19 and a spiral fixed wall 21 extending from the fixed end plate 19 toward the rotary scroll 9. On the other hand, the rotary scroll 9 is supported by the main shaft 11 and a rotation preventing portion 23 in a manner allowing it to revolve. The rotary scroll 9 is provided with a rotary end plate 25 and a spiral rotary wall plate 27 extending from the rotary end plate 25 toward the fixed scroll 7. The fixed scroll 7 and the rotary scroll 9 are disposed in such a manner that the fixed wall 21 and the rotary wall plate 27 engage with each other to form a compression chamber C therebetween.

The fixed end plate 19 is provided with a discharge opening 29 in the center thereof, through which refrigerant compressed in the compression chamber C flows into a discharge chamber 31 formed between the first housing 13 and the fixed scroll 7.

The surface, facing the main shaft 11, of the rotary end plate 25 is provided with a boss 33 extending toward the main shaft 11. The boss 33 is provided with a rotary unit bearing that rotatably supports a bush 45 to which a revolution driving force is transferred via the main shaft 11.

The main shaft 11 is a columnar member extending from the motor unit 5 toward the rotary scroll 9. The main shaft 11 is provided with a columnar crankshaft 37 fixed to a rotor 65, a disc 39 that is larger in diameter than the crankshaft 37, and a crankpin 41 eccentric positioned from the central axis of the crankshaft 37.

A rotary driving force generated by a stator 63 and the rotor 65 is transferred to the crankshaft 37. The disc 39 is supported by a radial bearing 43 and is provided with the crankpin 41. The crankpin 41 transfers the rotary driving force transferred to the crankshaft 37 to rotationally drive the rotary scroll 9.

The crankpin 41 is provided with the bush 45 and a counterweight 47. The bush 45 is a cylindrical member disposed between the crankpin 41 and the boss 33 and transfers the driving force of the main shaft 11 to the rotary scroll 9. The counterweight 47 is a member that maintains balance during rotary motion of the rotary scroll 9.

The first housing 13 is a bottomed cylindrical member in which the fixed scroll 7 is fixed to the bottom face. A discharge chamber 31 into which refrigerant compressed by the fixed scroll 7 and the rotary scroll 9 flows is formed between the fixed scroll 7 and the first housing 13.

The first housing 13 is provided with a discharge unit (not shown) that guides the refrigerant in the discharge chamber 31 to the exterior, a first mounting portion 49, and a first flange 51.

The first mounting portion 49 is used for fixing the electric compressor 1 to an object, such as the frame of a vehicle or a bracket or the like disposed on the frame. The first mounting portion 49 protrudes radially outward from the outer peripheral surface of the first housing 13. The first mounting portion 49 is provided with a first mounting hole 50 through which a mounting bolt (not shown) used to mount the electric compressor 1 to a fixing object, such as the frame of the vehicle or an engine block, is passed.

The first flange 51, which is used for fixing the first housing 13, the second housing 15, and a motor case 67 together, is a member that extends radially outward from the opening-side end of the first housing 13. The first flange 51 is provided with through-holes through which housing bolts 53 for fixing the first housing 13, the second housing 15, and the motor case 67 together are passed.

The second housing 15 is a member provided with a cylindrical side wall 55 and a collar 57 that extends radially outward from an end at the first housing 13 side. The second housing 15 is disposed such that the collar 57 is flanked by the first housing 13 and the motor case 67.

The side wall 55 of the second housing 15 accommodates a radial bearing 43 that rotatably supports the main shaft 11, and is provided an suction channel 59 extending along the central axis of the main shaft 11 inside the side wall 55.

The collar 57 of the second housing 15 is provided with a second flange 61 used for fixing the first housing 13, the second housing 15, and the motor case 67 together. The second flange 61 is a member extending radially outward from the collar 57 and has through-holes through which the housing bolts 53 for fixing the first housing 13, the second housing 15, and the motor case 67 together are passed.

The motor unit 5 is provided with a stator 63 and the rotor 65 for driving the rotary scroll 9, the motor case (casing) 67 that accommodates the stator 63 and the rotor 65, and an inverter (supply unit) 69 that controls an alternating current to be supplied to the stator 63.

The stator 63 rotates the rotor 65 by forming an alternating-current magnetic field in accordance with an alternating current supplied from the inverter 69. The stator 63 is provided with a coil 71 to which an alternating current is supplied from the inverter 69 and a stator core 73 formed of a magnetic material such as iron.

Figure 2:
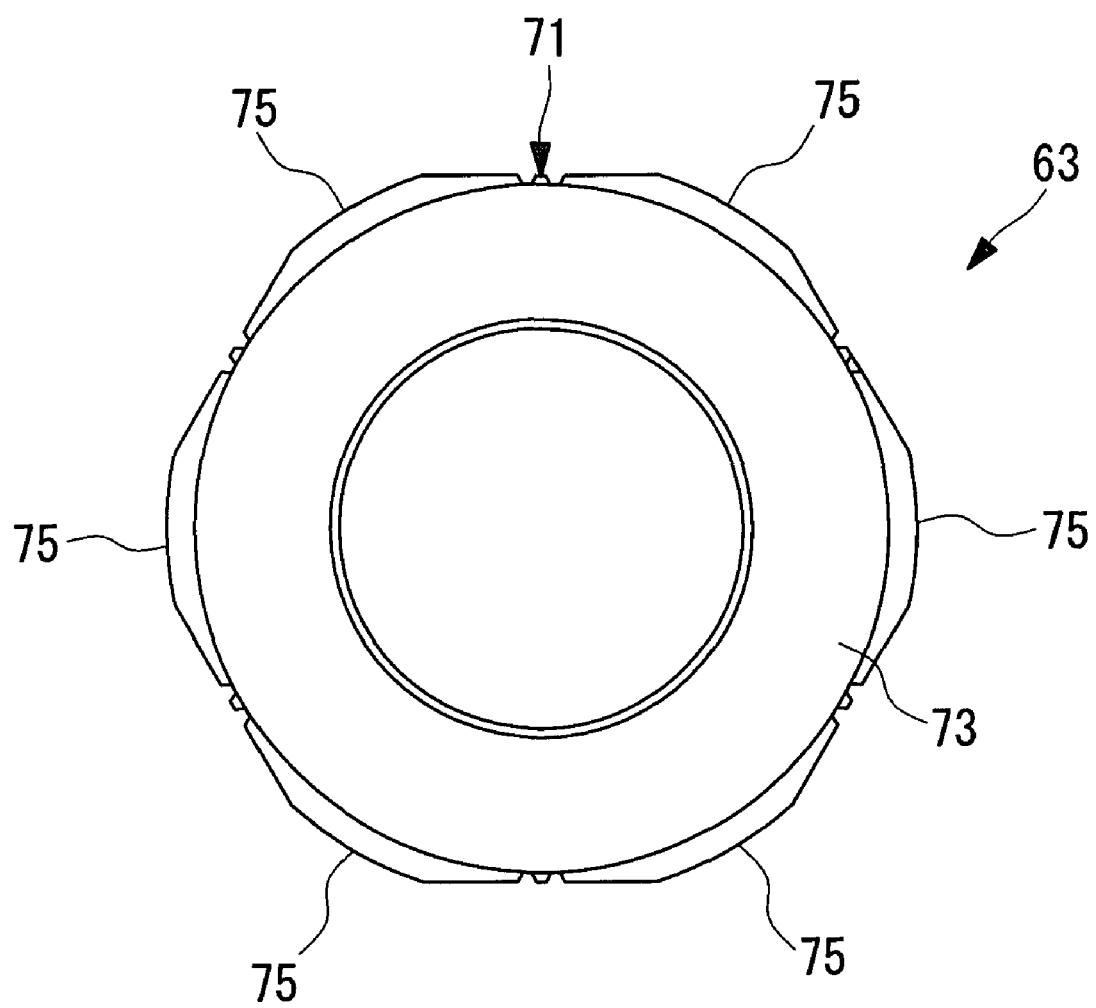
FIG. 2 is a side view describing the configuration of a stator in FIG. 1.

FIG. 2 is a side view describing the configuration of the stator in FIG. 1.

As shown in FIG. 2, the circumferential surface of the stator core 73 is provided with six convex portions 75, which come in contact with shrink-fitting surfaces 105, to be described later, at positions facing the shrink-fitting surfaces 105. The coil 71 is wound around the stator core 73.

As shown in FIG. 1, the rotor 65 is a cylindrical permanent magnet that generates a rotary driving force by means of an alternating-current magnetic field formed by the stator 63. The crankshaft 37 of the main shaft 11 is fixed to the rotor 65.

Figure 3:
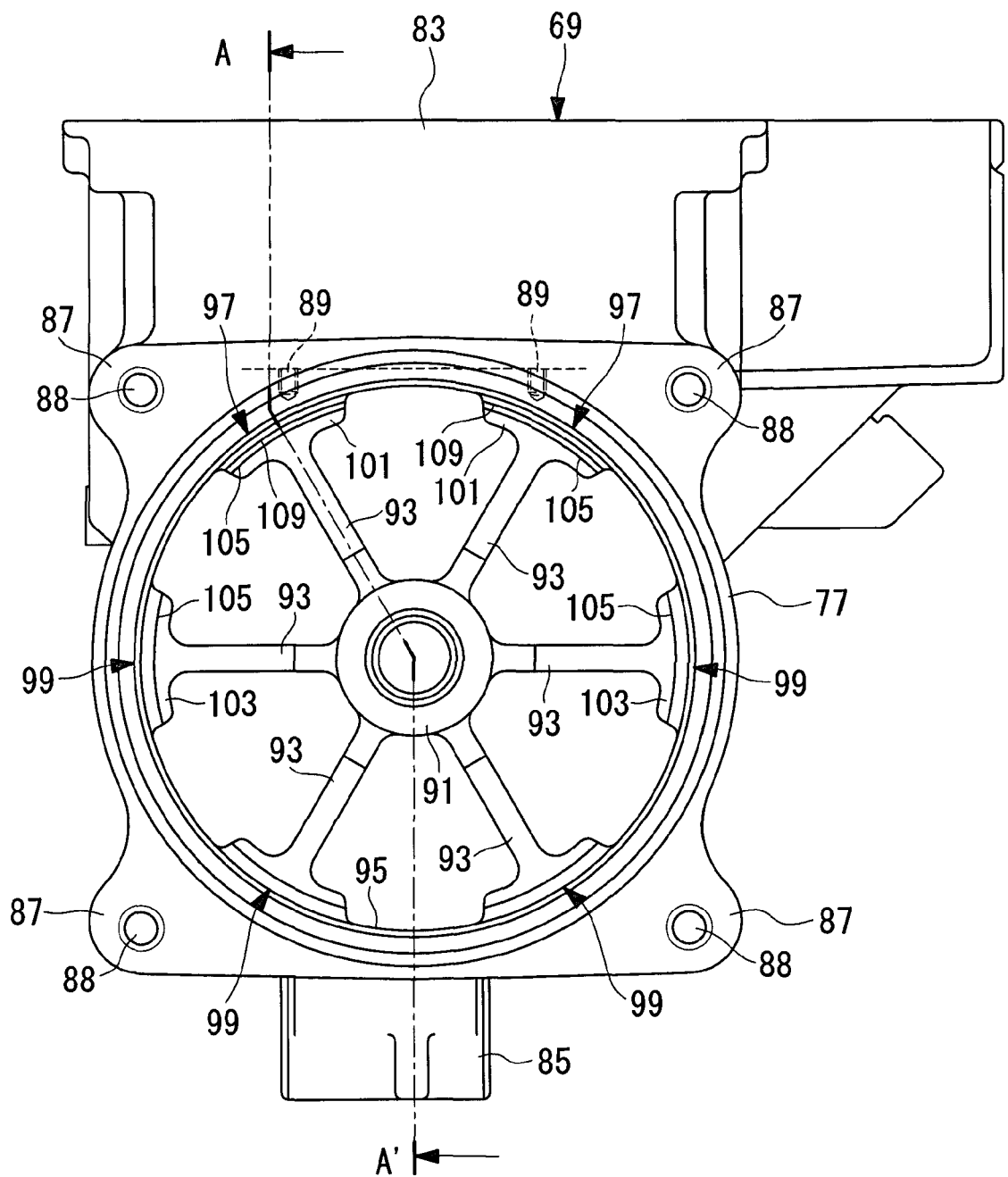
FIG. 3 is a diagram describing the configuration of a motor case in FIG. 1, as viewed from the opening side.
Figure 4:
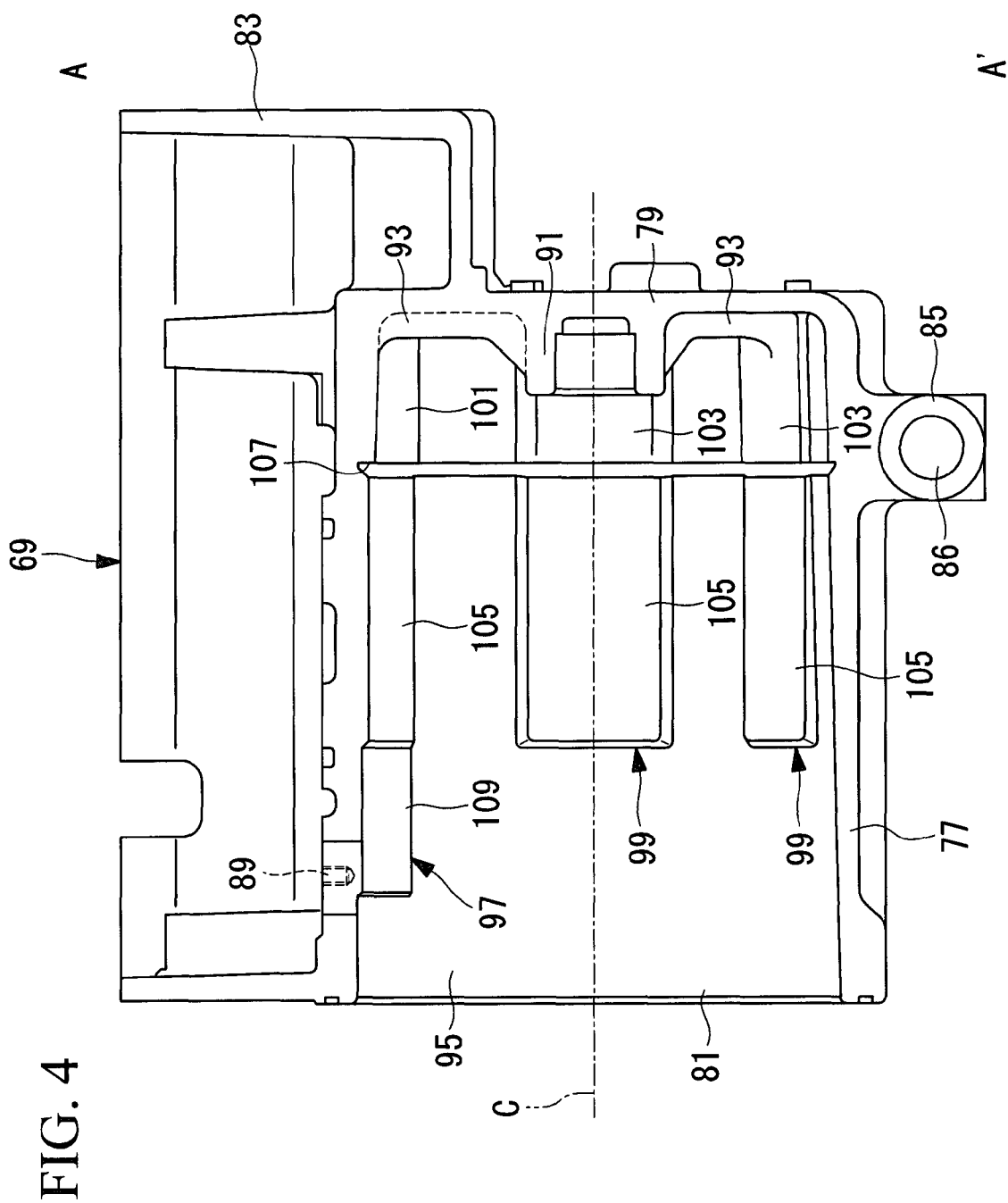
FIG. 4 is an A-A' cross-sectional view describing the configuration of the motor case in FIG. 3.

FIG. 3 is a diagram describing the configuration of the motor case in FIG. 1, as viewed from the opening side. FIG. 4 is an A-A' sectional view describing the configuration of the motor case in FIG. 3.

As shown in FIGS. 1, 3, and 4, the motor case 67 is principally composed of a tubular cylinder 77 that accommodates the stator 63 and the rotor 65, a bottom face 79 provided at one end of the cylinder 77, and an opening 81 at the other end. The motor case 67 is formed of an aluminum alloy, for example.

The area, adjacent to the bottom face 79, of the cylinder 77 is provided with an suction portion (not shown) into which refrigerant flows from the exterior.

As shown in FIGS. 3 and 4, the cylinder 77 is provided with a box (mounting unit) 83 in which the inverter 69 is accommodated, a second mounting portion 85, and a case flange 87.

The box 83 accommodates the inverter 69. The box 83 is open toward the outside in the radial direction of the cylinder 77, and the outer circumferential surface of the cylinder 77 that forms the bottom face of the box 83 is provided with a plurality of threaded holes (mounting holes) 89 for fixing the components of the inverter 69.

The second mounting portion 85 is used for fixing the electric compressor 1 to an object, such as the frame of a vehicle or a bracket or the like disposed on the frame. The second mounting portion 85 protrudes radially outward from the outer circumferential surface of the cylinder 77. The second mounting portion 85 is provided with a mounting hole 86 through which a mounting bolt (not shown) used for mounting the electric compressor 1 to a fixing object, such as the frame of a vehicle or an engine block, is passed.

The case flange 87, which is used for fixing the first housing 13, the second housing 15, and the motor case 67 together, is a member that extends radially outward from the opening-side end of the motor case 67. Threaded holes 88 in which the housing bolts 53 for fixing the first housing 13, the second housing 15, and the motor case 67 together are screwed are formed in the case flange 87.

As shown in FIGS. 3 and 4, a cylindrical support 91 that supports one end of the crankshaft 37 is provided at the center of the bottom face 79, and six bottom-face ribs 93 extend radially outward from the support 91 at regular intervals.

The inner surface of the cylinder 77 is provided with an inner circumferential surface (a third inner circumference) 95 having an inclination (a draft angle) that becomes more distant from the central axis C of the motor case 67 from the bottom face 79 toward the opening 81, and first side-face ribs 97 and second side-face ribs 99 which extend, in the form of extensions of the bottom-face ribs 93, from the bottom face 79 toward the opening 81. The inner circumferential surface 95 is a mill-scale surface.

As shown in FIGS. 3 and 4, the first side-face ribs 97 are disposed at positions adjacent to the box 83, and first inner circumferential surfaces (first inner circumferences) 101, facing the central axis C, of the first side-face ribs 97 are formed such that the radiuses are smaller than those of the inner circumferential surface 95 and second inner circumferential surfaces 103, to be described later. This embodiment is described when applied to an example in which two first side-face ribs 97 are provided.

The first side-face ribs 97 extend so that the ends at the opening 81 side are located closer to the opening 81 than the second side-face ribs 99 and are connected to the inner circumferential surface 95 via the inclined surface.

The space that is enclosed by the first side-face ribs 97, the second side-face ribs 99, the inner circumferential surface 95, and the stator 63 and that extends from the bottom face 79 toward the opening 81 is used as a channel through which refrigerant flowing from the above-described suction portion flows toward the scroll compressing unit 3.

The second side-face ribs 99 are ribs disposed at positions remote from the box 83, and the second inner circumferential surfaces (second inner circumferences) 103, facing the central axis C, of the second side-face ribs 99 are smaller in radius than the inner circumferential surface 95 and larger in radius than the first inner circumferential surfaces 101. This embodiment is described when applied to an example in which four second side-face ribs 99 are provided.

The second side-face ribs 99 extend so that the ends at the opening 81 side are located farther away from the opening 81 than the first side-face ribs 97 and are connected to the inner circumferential surface 95 via the inclined surface.

Like the inner circumferential surface 95, the first inner circumferential surfaces 101 and the second inner circumferential surfaces 103 are mill-scale surfaces having an inclination (a draft angle) that becomes more distant from the central axis C from the bottom face 79 toward the opening 81.

The first inner circumferential surfaces 101 and the second inner circumferential surfaces 103 have the shrink-fitting surfaces 105 to which the stator 63 is shrink-fitted. In the area in which the shrink-fitting surfaces 105 are formed, the shrink-fitting surfaces 105 are formed in a cylindrical surface larger in radius than the first inner circumferential surfaces 101 and the second inner circumferential surfaces 103 and smaller in radius than the inner circumferential surface 95. The shrink-fitting surfaces 105 are formed by machining the first inner circumferential surfaces 101 and the second inner circumferential surfaces 103 because they require high dimensional accuracy.

A contact face 107 that defines the placement position of the stator 63 by coming into contact with the stator 63 is formed at the ends at the bottom face 79 side of the shrink-fitting surfaces 105.

The shrink-fitting surfaces 105 of the second inner circumferential surfaces 103 extend to the inclined surface that connects the second inner circumferential surfaces 103 and the inner circumferential surface 95. On the other hand, the shrink-fitting surfaces 105 of the first inner circumferential surfaces 101 extend to enlarged-diameter portions 109, to be described later.

The enlarged-diameter portions 109 are provided for avoiding interference during shrink-fitting of the stator 63 between the ends at the opening 81 side of the first inner circumferential surfaces 101 and the shrink-fitting surfaces 105. In areas in which the enlarged-diameter portions 109 are formed, the enlarged-diameter portions 109 are formed as surfaces larger in radius than the shrink-fitting surfaces 105 and smaller in radius than the inner circumferential surface 95. The enlarged-diameter portions 109 are formed by forming the shrink-fitting surfaces 105 and then machining the first inner circumferential surfaces 101.

The distance from the ends at the bottom face 79 side of the enlarged-diameter portions 109 to the opening 81 is formed so as to be substantially equal to the distance from the ends at the opening 81 side of the shrink-fitting surfaces 105 of the second inner circumferential surfaces 103 to the opening 81. In other words, the enlarged-diameter portions 109 are formed so that the distances from the ends at the opening 81 side of the shrink-fitting surfaces 105 of the first inner circumferential surfaces 101 and the second inner circumferential surfaces 103 to the opening 81 are substantially the same around the circumference of the shrink-fitting surfaces 105.

Figure 5:
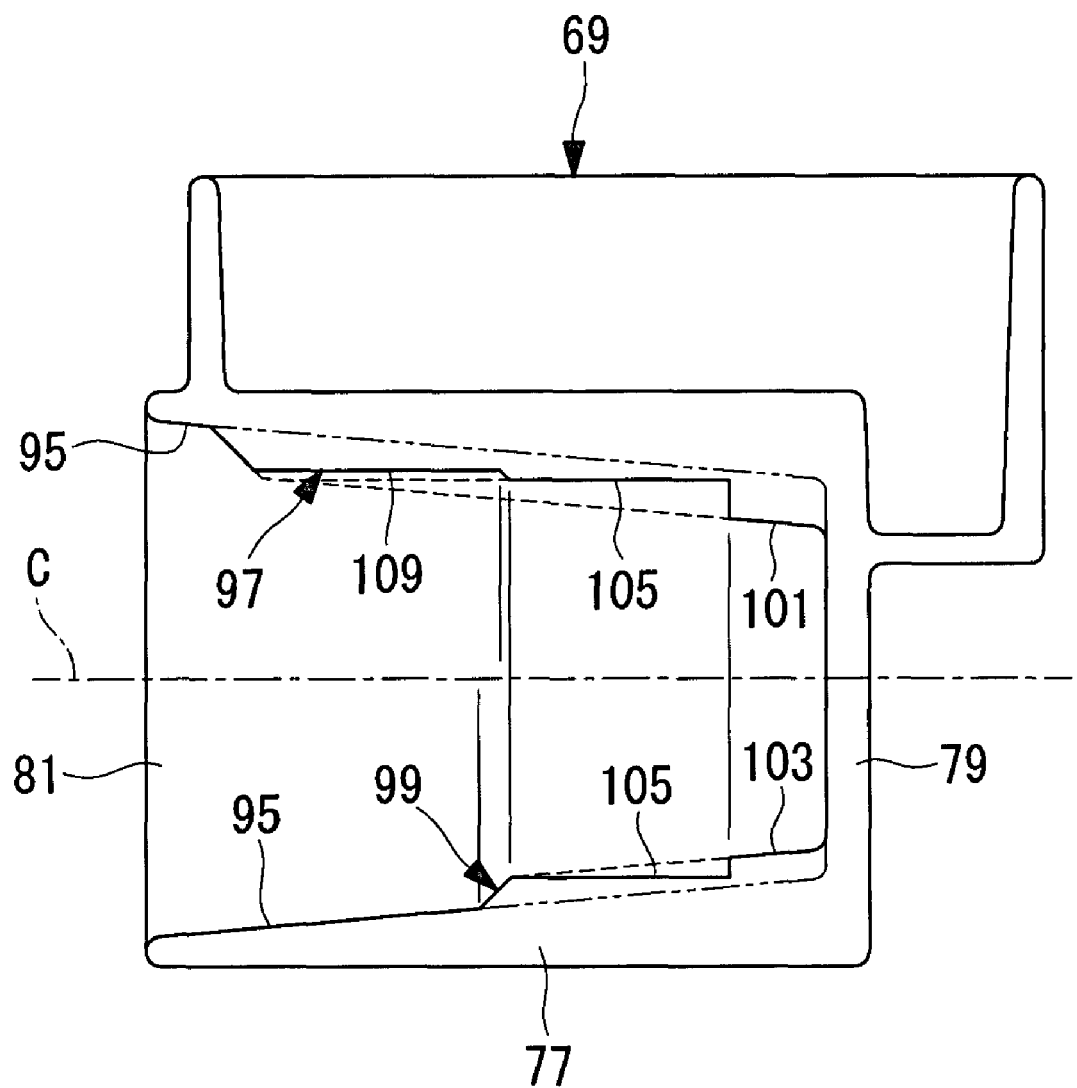
FIG. 5 is a schematic diagram describing the configuration of the motor case in FIG. 4.

FIG. 5 is a schematic diagram describing the configuration of the motor case in FIG. 4.

The arrangement of the inner circumferential surface 95, the first inner circumferential surface 101, the second inner circumferential surface 103, the shrink-fitting surface 105, and the enlarged-diameter portion 109, described above, is as shown in FIG. 5.

The inner circumferential surface 95, the first inner circumferential surfaces 101, and the second inner circumferential surfaces 103 are formed in the motor case 67 immediately after casting. The first inner circumferential surfaces 101 and the second inner circumferential surfaces 103 are indicated by solid lines and dotted lines.

From this state, the first inner circumferential surfaces 101 and the second inner circumferential surfaces 103 are machined in a cylindrical shape to form the shrink-fitting surfaces 105. Thereafter, the shrink-fitting surfaces 105 formed on the first side-face ribs 97 are machined to form the enlarged-diameter portions 109. This makes the shrink-fitting lengths of the shrink-fitting surfaces 105 formed on the first side-face ribs 97 and the second side-face ribs 99 substantially equal.

Although this embodiment is described when applied to an example in which the enlarged-diameter portion 109 is formed only on the first inner circumferential surfaces 101, the enlarged-diameter portion 109 may be formed on the first inner circumferential surfaces 101 and the second inner circumferential surfaces 103, without particular limitation.

As shown in FIG. 1, the inverter 69 controls an alternating current to be supplied to the stator 63 and is disposed in the box 83. The inverter 69 is provided with a capacitor (condenser) 111, a plurality of substrates 115 provided with electronic devices, such as power transistors 113, and a terminal 117.

The capacitor 111 temporarily stores an electric current. The electronic devices, such as the power transistors 113, provided on the substrates 115 control the frequency of an alternating current supplied from the exterior. The terminal 117 supplies the alternating current to the stator 63.

A substrate 115 provided with the power transistors 113 is fixed to threaded holes 89 formed in the cylinder 77 in the box 83 with fixing screws 90. The other substrates 115 are fixed in positions remote from the cylinder 77. In other words, the substrates 115 are fixed in layers.

The terminal 117 supplies the alternating current controlled by the power transistors 113 and so on to the stator 63.

Next, a method for shrink-fitting the stator 63 to the motor case 67 with the above configuration, according to the characteristics of this embodiment, will be described.

As shown in FIG. 3, to shrink-fit the stator 63 into the motor case 67, the motor case 67 is thermally expanded by heating it to a predetermined temperature. One example of the temperature for heating the motor case 67 is 150° C.

Figure 6:
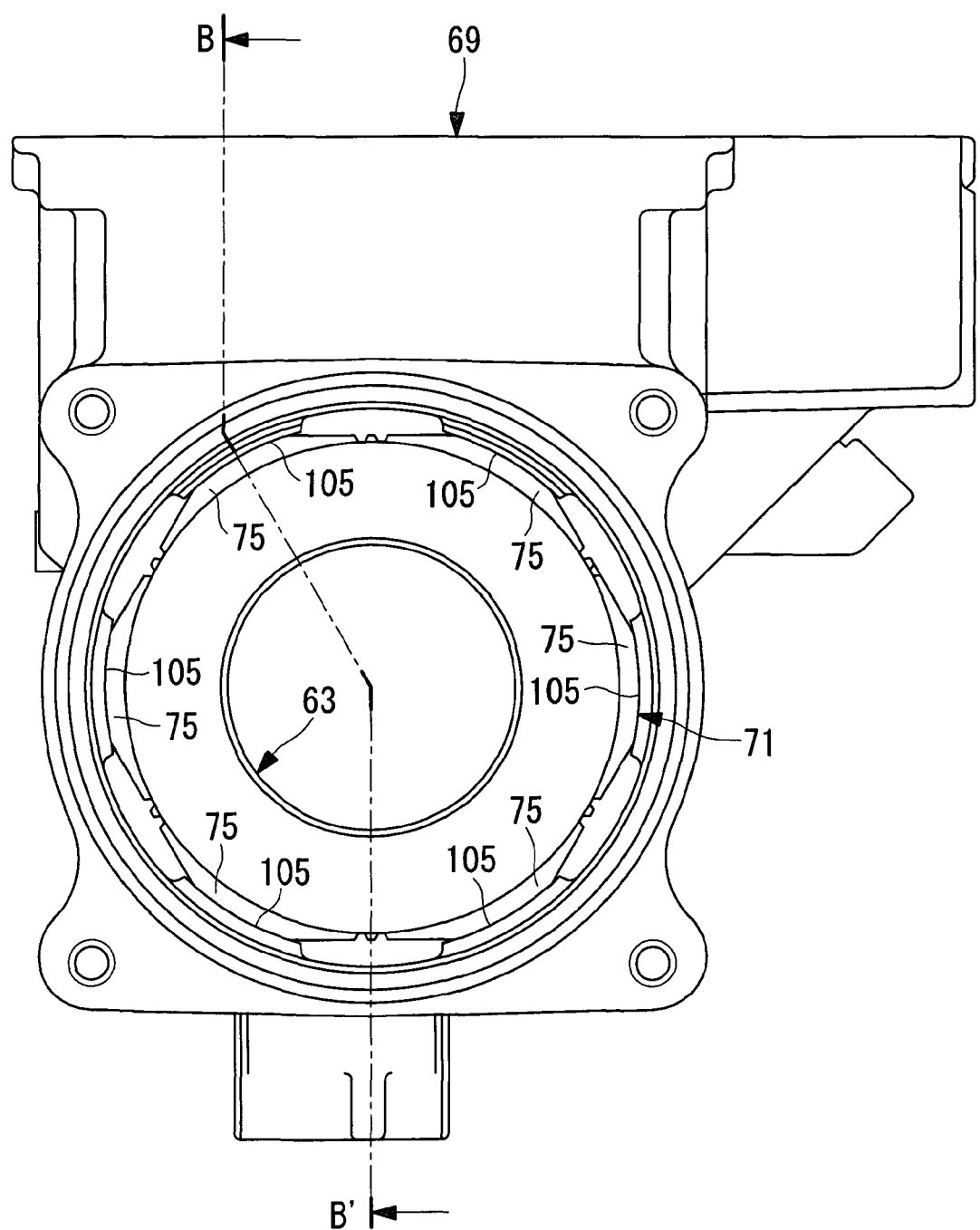
FIG. 6 is a schematic diagram describing a state where the stator is shrink-fitted into the motor case in FIG. 1.
Figure 7:
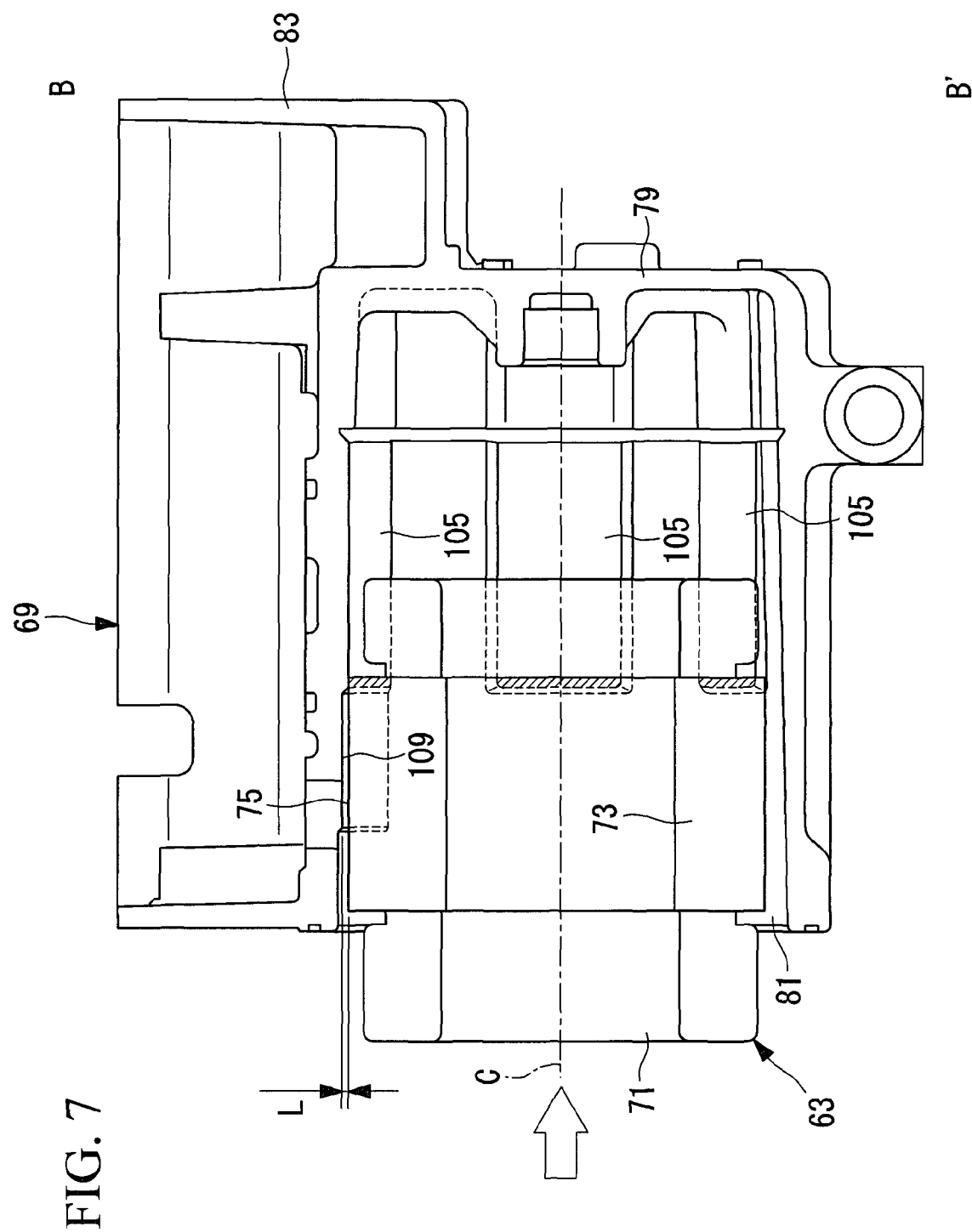
FIG. 7 is a B-B' sectional view of the initial stage of shrink fitting in FIG. 6.

FIG. 6 is a schematic diagram describing a state where the stator is shrink-fitted into the motor case in FIG. 1. FIG. 7 is a B-B' sectional view of the initial stage of shrink-fitting in FIG. 6.

Thereafter, as shown in FIGS. 6 and 7, the stator 63 is inserted into the shrink-fitting surfaces 105, with the motor case 67 and the stator 63 held by a jig (not shown).

As shown in FIG. 7, the stator 63 enters the motor case 67 while maintaining a distance L from the enlarged-diameter portion 109, without contacting with the enlarged-diameter portion 109, and contacts the ends at the opening 81 side of the shrink-fitting surfaces 105. Since the ends at the opening 81 side of the shrink-fitting surfaces 105 are at substantially equal distances from the opening 81 in the circumferential direction, the stator core 73 and the shrink-fitting surfaces 105 come into contact with each other substantially at the same time in the circumferential direction. Referring to FIG. 7, the diagonally shaded portions are the contact portions between the stator core 73 and the shrink-fitting surfaces 105.

This can prevent the occurrence of a rotation moment that acts on the stator core 73 when inserting the stator core 73 into the shrink-fitting surfaces 105, thereby stabilizing the position of the stator core 73.

Figure 8:
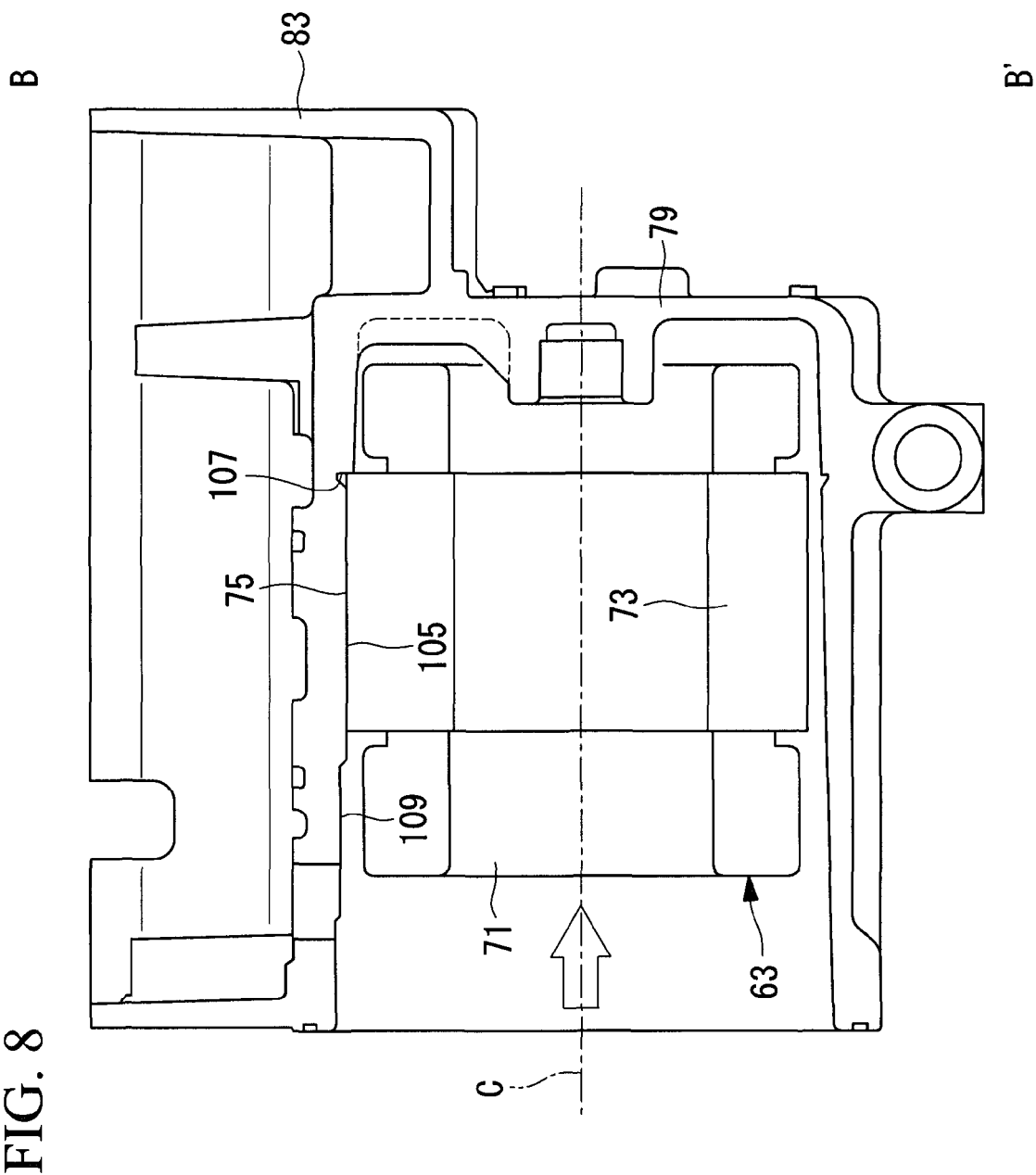
FIG. 8 is a B-B' sectional view at the end of the shrink fitting in FIG. 6.

FIG. 8 is a B-B' sectional view at the end of the shrink fitting in FIG. 6.

Thereafter, the stator core 73 moves toward the bottom face 79 while sliding on the shrink-fitting surfaces 105 and, as shown in FIG. 8, is inserted until the end at the bottom face 79 side of the stator core 73 comes into contact with the contact face 107.

Next, compression of refrigerant by the electric compressor 1 of this embodiment will be described.

As shown in FIG. 1, a direct current supplied from the exterior of the inverter is frequency controlled by the electronic devices, such as the power transistors 113, of the inverter 69 and is supplied to the motor unit 5.

In the motor unit 5, the stator 63 forms an alternating-current magnetic field according to the frequency-controlled alternating current. The rotor 65 generates a rotary driving force by interaction with the formed alternating-current magnetic field. The rotary driving force generated by the rotor 65 is transferred to the main shaft 11.

The rotary driving force is transferred to the crankshaft 37 of the main shaft 11 and the disc 39, so that the crankpin 41 is rotationally driven by the rotation of the disc 39. The rotary motion of the crankpin 41 is transferred to the rotary scroll 9 through the bush 45 and the boss 33. The rotary scroll 9 is revolved, with the rotary motion being restricted by a rotation preventing portion 23.

When the rotary scroll 9 is revolved, the compression chamber C formed between it and the fixed scroll 7 takes in the refrigerant that has flowed to the scroll compressing unit 3 from the motor case 67 and compresses it. Specifically, the compression chamber C takes in the refrigerant at the peripheral ends of the fixed scroll 7 and the rotary scroll 9. The compression chamber C is decreased in volume from the peripheral end toward the center along the fixed wall 21 and the rotary wall plate 27 by the revolution of the rotary scroll 9 to compress the intake refrigerant.

The refrigerant compressed by the compression chamber C is discharged into the discharge chamber 31 through a discharge opening 29 of the fixed scroll 7 and is discharged to the exterior of the first housing 13 from the interior of the discharge chamber 31.

With the above configuration, since the first inner circumferential surfaces 101 are provided with the enlarged-diameter portions 109, the distance from the ends of the shrink-fitting surfaces 105 of the first inner circumferential surfaces 101 to the opening 81 can be increased so that the distance from the ends of the shrink-fitting surfaces 105 to the opening 81 can be made to match the distance from the ends of the shrink-fitting surfaces 105 of the second inner circumferential surfaces 103 to the opening 81, thus allowing the distance to be made substantially equal around the circumference of the shrink-fitting surface 105. In other words, this can reduce variations in shrink-fitting length between the stator 63 and the shrink-fitting surfaces 105, thereby preventing partial contact between the stator 63 and the shrink-fitting surfaces 105 when shrink-fitting the stator 63 into the shrink-fitting surfaces 105. Thus, a rotation moment that acts on the stator 63 can be reduced, thereby preventing the occurrence of shrink-fitting failures when shrink-fitting the stator 63 into the motor case 67.

The ends at the opening 81 side of the shrink-fitting surfaces 105 are located at the joint portions between the first inner circumferential surfaces 101 and the inner circumferential surface 95 and at the joint portions between the second inner circumferential surfaces 103 and the inner circumferential surface 95. This eliminates the need for forming the enlarged-diameter portion 109 in the area in which the inner circumferential surface 95 is formed, which can reduce the area in which the enlarged-diameter portion 109 is to be formed as compared with a case in which the inner circumferential surface 95 is not formed.

Since the first inner circumferential surfaces 101 of the first side-face ribs 97 and the second inner circumferential surfaces 103 of the second side-face ribs 99 are formed like a strip-shaped, the shrink-fitting surfaces 105 can also be formed as part of a cylindrical surface extending like a strip-shaped. This allows the contact area between the stator 63 and the shrink-fitting surfaces 105 to be limited, thus making it easier to reduce variations in shrink-fitting length between the stator 63 and the shrink-fitting surfaces 105.

Since the area in which the first inner circumferential surfaces 101 and the second inner circumferential surfaces 103 are formed can be reduced as compared with a case in which the first inner circumferential surfaces 101 and the second inner circumferential surfaces 103 are not formed like a strip-shaped, the area in which the enlarged-diameter portion 109 is to be formed can be reduced.

The ends at the opening 81 side of the shrink-fitting surfaces 105 formed on the second inner circumferential surfaces 103 are located closer to the bottom face 79 than the ends at the opening 81 side of the shrink-fitting surfaces 105 formed on the first inner circumferential surfaces 101. Forming the enlarged-diameter portions 109 on the first inner circumferential surfaces 101 can reduce variations in shrink-fitting length between the stator 63 and the shrink-fitting surfaces 105.

The areas of the motor case 67 in which the first inner circumferential surfaces 101 are provided are larger in thickness from the inner peripheral surface to the outer peripheral surface of the motor case 67 than the areas in which the second inner circumferential surfaces 103 are provided. This makes it easy to ensure a sufficient wall thickness of the box 83 for forming concave structures, such as the threaded holes 89 for mounting the substrates 115, thus preventing the threaded holes 89 from passing through the motor case 67.

As in the above-described embodiment, the first side-face ribs 97 may be disposed at positions adjacent to the box 83 to ensure a sufficient wall thickness for forming a concave structure such as the threaded holes 89, or alternatively, the first side-face ribs 97 may be disposed at positions adjacent to the second mounting portion (mounting portion) 85, without particular limitation.

Since such placement ensures a sufficient thickness of the cylinder 77 of the motor case 67, the electric compressor 1 can withstand stress applied to the base of the second mounting portion 85 when an external force is applied.

The invention claimed is:

1. An electric compressor comprising:
a casing that is a substantially cylindrical member having a bottom face at one end and an opening at the other end, the inner circumferential surface of the cylinder being provided with a first inner circumference and a second inner circumference whose radius is larger than the first inner circumference, the inner circumferential surface having an inclination that becomes more distant from a central axis from the bottom face toward the opening;
a compressing unit that compresses fluid; and
a motor unit including a rotor and a stator that rotationally drive the compressing unit, wherein
the first inner circumference and the second inner circumference are provided with a substantially cylindrical insertion surface whose radius is larger than the second inner circumference in a cross section perpendicular to the central axis of the casing and in which the stator is inserted; and
at least the first inner circumference is provided with an enlarged diameter portion whose radius is larger than the insertion surface and which makes the distance from the opening-side end of the insertion surface to the opening substantially equal.

2. The electric compressor according to claim 1, wherein the casing is provided with a third inner circumference whose radius is larger than the enlarged diameter portion and which disposed closer to the opening than at least the first inner circumference and the second inner circumference.

3. The electric compressor according to claim 2, wherein the first inner circumference and the second inner circumference are provided so as to extend like a strip-shaped from the bottom face toward the opening.

4. The electric compressor according to claim 2, wherein the second inner circumference is disposed closer to the bottom face than at least the first inner circumference.

5. The electric compressor according to claim 1, wherein the outer peripheral surface of the casing at which the first inner circumference is provided has a mounting unit.

6. The electric compressor according to claim 5, wherein the mounting unit is provided with a mounting hole to which a supply unit for supplying electric power to the motor unit is mounted.

7. The electric compressor according to claim 5, wherein the mounting unit is used to mount the casing to an external fixing object.

* * * * *